US006423417B1

(12) United States Patent
Robbins

(10) Patent No.: US 6,423,417 B1
(45) Date of Patent: Jul. 23, 2002

(54) NON-STICK POLYMER COATED ALUMINUM FOIL

(75) Inventor: Bruce Robbins, Richmond, VA (US)

(73) Assignee: Reynolds Metals Company, Richmond, VA (US)

( * ) Notice: Subject to any disclaimer, the term of this patent is extended or adjusted under 35 U.S.C. 154(b) by 0 days.

(21) Appl. No.: 09/576,886

(22) Filed: May 24, 2000

(51) Int. Cl.$^{7}$ .................................... B32B 15/04

(52) U.S. Cl. ...................... 428/450; 427/178; 427/379; 427/387; 427/388.1; 428/447; 428/689; 524/267; 524/323; 524/736; 524/438; 106/287.12; 106/287.13

(58) Field of Search ............................ 427/387, 379, 427/178, 388.1; 428/447, 450, 689; 524/323, 267, 736, 738

(56) References Cited

U.S. PATENT DOCUMENTS

| | | | | | |
|---|---|---|---|---|---|
| 3,861,939 | A | * | 1/1975 | Merrill et al. | |
| 4,211,338 | A | | 7/1980 | Bublitz | 220/359 |
| 4,279,717 | A | | 7/1981 | Eckberg et al. | 204/159.13 |
| 4,421,904 | A | | 12/1983 | Eckberg et al. | 528/27 |
| 4,977,198 | A | | 12/1990 | Eckberg | 522/25 |
| 5,085,924 | A | | 2/1992 | Eckberg | |
| 5,258,480 | A | | 11/1993 | Eckberg et al. | 528/15 |
| 5,360,833 | A | | 11/1994 | Eckberg et al. | 522/31 |
| 5,376,420 | A | | 12/1994 | Yamamoto et al. | 428/40 |
| 5,397,813 | A | | 3/1995 | Eckberg et al. | 522/31 |
| 5,446,312 | A | | 8/1995 | Hsieh et al. | 257/559 |
| 5,482,780 | A | | 1/1996 | Wilkie et al. | 428/515 |
| 5,543,457 | A | * | 8/1996 | Lewis et al. | |
| 5,691,401 | A | | 11/1997 | Morita et al. | 523/435 |
| 5,725,695 | A | | 3/1998 | Ward et al. | 148/552 |
| 5,756,165 | A | * | 5/1998 | Ali et al. | |
| 5,830,548 | A | * | 11/1998 | Andersen et al. | |
| 5,942,557 | A | | 8/1999 | Ooms et al. | 522/77 |

FOREIGN PATENT DOCUMENTS

| | | |
|---|---|---|
| EP | 0 471 589 A2 | 8/1991 |
| EP | 0 471 589 B1 | 8/1991 |
| EP | 0 471 589 A3 | 8/1991 |
| WO | WO 96/18497 | 6/1996 |

* cited by examiner

*Primary Examiner*—Robert Dawson
*Assistant Examiner*—Marc Zimmer
(74) *Attorney, Agent, or Firm*—Nancy J. Flint; Tracey D. Beiriger

(57) ABSTRACT

A non-stick polymer coated aluminum foil and method of making it. The polymer coating composition comprises a silicone resin, a silicone release agent, a silicone curing agent, a hindered phenol antioxidant and a solvent. The method of making the non-stick polymer coated aluminum foil includes applying the polymer coating composition on at least a portion of one side of the aluminum foil and partially curing the coating composition to allow handling and future processing of the coated aluminum foil without blocking of the coating composition. The curing of the coating composition is completed by heating the coated aluminum foil in bulk.

41 Claims, 1 Drawing Sheet

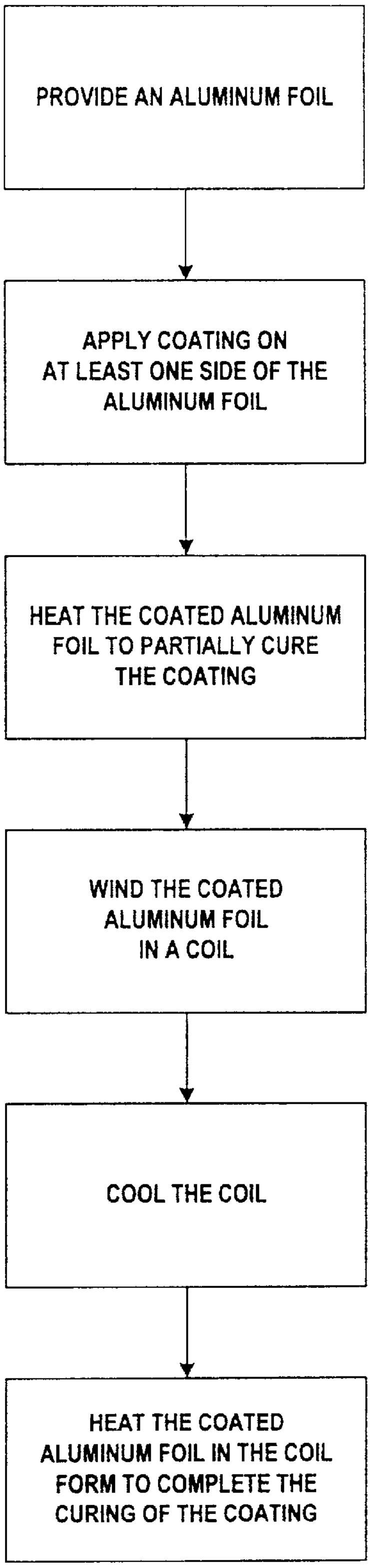
FIGURE

NON-STICK POLYMER COATED ALUMINUM FOIL

FIELD OF THE INVENTION

The present invention relates to non-stick, curable coating compositions and non-stick coated articles. More specifically, the invention relates to a non-stick, silicone based coating composition that is especially suitable for coating aluminum foil, a coated aluminum foil and a method of making the coated aluminum foil.

BACKGROUND OF THE INVENTION

Non-stick, silicone based coatings are used in the foodstuff sector for the finishing of baking tins and baking trays. They are typically sprayed on a substrate and cured either at room temperature or by heating the coated substrate to high temperatures. One problem associated with curing at high temperatures is that by-products are generated that impart an off odor to the coated substrate. Moreover, curing at high temperatures is generally an expensive process with high operating costs and low throughput rates.

Aluminum foil products and methods for making them are well known in the industry such as the ones described in U.S. Pat. Nos. 5,466,312 and 5,725,695, which are assigned to the assignee of the present invention, and which are incorporated herein by reference to the extent that they are not inconsistent with the disclosure and claims of the present invention. Aluminum foil products have many applications such as household wraps to contain food and other items and to make containers for food, drugs, and the like. For instance, U.S. Pat. No. 4,211,338, which is assigned to the assignee of the present invention, describes the use of a coated aluminum foil that is used to form a food container, wherein the coating is made with polyvinyl chloride resin.

BRIEF DESCRIPTION OF DRAWINGS

Reference is now made to the sole drawing of the invention wherein a schematic flow diagram is shown exemplifying one embodiment of the method of the invention.

SUMMARY OF THE INVENTION

It is an object of the present invention to provide a non-stick, polymer based coating composition that is suitable for coating aluminum foils. It is another object of the present invention to provide a curable polymer coating composition that does not generate by-products during curing that impart an off odor to the coated article. It is yet another object of the present invention to provide a non-stick, polymer coated aluminum foil that is acceptable for direct food contact. It is yet another object of the present invention to provide a simple and economical method of making the non-stick, polymer coated aluminum foil. Other objects of the present invention will become apparent to those skilled in this art from the following description.

In its broadest aspect, the present invention relates to a non-stick, coating composition which includes a silicone resin, a silicone resin curing agent, a silicone release agent, a solvent and an effective amount of a hindered phenol antioxidant. The silicone resin is selected from the group consisting of dimethyl polysiloxanes, polyester-modified methylphenyl polysiloxanes and hydroxyl functional silicone resins.

The present invention further relates to a non-stick, polymer coated aluminum foil. The coated aluminum foil includes a non-stick, coating comprising a silicone resin, a silicone resin curing agent, a silicone release agent, and a hindered phenol antioxidant. The silicone resin is selected from the group consisting of dimethyl polysiloxanes, polyester-modified methylphenyl polysiloxanes, and hydroxyl functional silicone resins.

The non-stick, coated alumina foil maybe made by a process of the present invention which includes applying a curable coating composition on at least a portion of one side of an aluminum foil. The coating composition is partially cured in a first heating step to a sufficient level to allow further curing or completing the curing of the coating in bulk without blocking or sticking problems. The phrase "completing the curing" is used herein to mean sufficiently curing the coating to achieve the desired characteristics for the non-stick, coated aluminum foil. It should be appreciated that the desired characterstics such as the degree of non-stickiness, and bonding of the coating to the aluminum foil substrate may vary depending upon the desired application of the coated aluminum foil. The partially cured coated aluminum foil may then be cooled and further cured in bulk in a second curing step.

The method of the present invention is advantageous because it is simple and economical, it can be carried out at a high throughput rate, and it produces high quality product consistently without an off odor.

DETAILED DESCRIPTION OF THE INVENTION

The present invention relates to a non-stick, coating composition which includes a silicone resin, a silicone release agent, a silicone curing agent, a solvent and a hindered phenol. Silicone resins suitable for the coating composition of the present invention include dimethyl polysiloxanes, polyester-modified methylphenyl polysiloxanes, and hydroxyl functional silicone resins.

Examples of most preferred silicone resins include BAYSILONE® resin M120XB supplied by GE SILICONES located at 260 Hudson River Road, Waterford, N.Y. 12188, and SILIKOFTAL® non-stick 50 which is manufactured by Goldschmidt Chemical corporation located at 914 E. Randolph Road, Hopewell, Va. 23860. The BAYSILONE® resin M120XB is a dimethyl polysiloxane and the SILIKOFTAL® non-stick 50 is a polyester-modified methylphenyl polysiloxane resin.

The silicone release agent is employed to enhance the release properties of the cured coating composition. Suitable release agents incorporated at an effective amount in the coating composition will enhance the release properties of the cured coating composition such that foods stored or cooked in contact with the coating will not stick to the coating surface. Preferred silicone release agents are polydimethylsiloxane compounds such as DOW CORNING® 1-9770 compound which is a clear, high-viscosity, reactive silicone fluid, and SF96® 100 supplied by GE SILICONES, which is a clear, silicone fluid having a nominal viscosity of about 100 centistokes at 25° C. (77° F.). The release agent is used in an amount ranging from about 0.1 to about 5.0 percent by weight, preferably from about 0.5 to about 4.5 percent, and most preferably from about 2.0 to about 3.5 percent by weight based on the weight of the silicone resin.

The silicone resin curing agent also referred to as "curing catalyst" is used to initiate curing of the silicone resin. A preferred curing catalyst is zinc neodecanate. Other zinc salts such as zinc octoate also could be used. Preferably, the curing catalyst is used in amounts ranging from about 0.05 to about 2 percent zinc metal, preferably 0.1 percent and more preferably 0.1 to about 0.5 percent based on the weight of the silicone resin.

Any solvent that can dissolve silicone resins can be used such as esters, ketones, glycol ethers, aliphatic hydrocarbons and aromatic hydrocarbons or mixtures thereof, preferably esters, ketones and glycol ethers. Most preferred solvents are ethyl acetate, and butyl acetate. The total amount of solvent in the coating composition mixture may vary depending upon the desired silicone resin solids content in the coating composition mixture. Preferably, the amount of silicone resin solids in the coating composition mixture may range from about 5 to about 50 percent by weight, preferably from about 10 to about 40 percent by weight and more preferably from about 20 to about 35 percent by weight.

Preferred hindered phenol antioxidants include, but are not limited to 2,6-disubstituted phenols, bisphenols, polyphenols, substituted hydroquinones and substituted hindered anisoles. More preferred hindered phenols include the 2,6-di-t-butyl-methylphenol ("butylated hydroxy toluene" or "BHT"), 2-t-butyl-4-methoxy phenol, 3-t-butyl-4-methoxy phenol, 4-(hydroxymethyl)2,6-di-t-butyl phenol, and styrenated phenols. BHT is the most preferred hindered phenol antioxidant.

The hindered phenol antioxidant is preferably used in an amount from about 0.1 to about 4.0 percent by weight and, more preferably from about 0.5 to about 3.0 percent by weight based on the weight of the silicone resin. Other antioxidants that are compliant with Food and Drug Administration's regulations for direct contact food applications and inhibit the conversion of alcohols to acids may also be used.

The present invention further relates to a non-stick, polymer coated aluminum foil. The coated aluminum foil includes a non-stick, coating comprising a silicone resin, a silicone release agent, and a hindered phenol antioxidant. Preferably, the aluminum foil is made according to U.S. Pat. Nos. 5,466,312 and 5,725,695 which are assigned to the assignee of the present invention and which are incorporated herein by reference to the extent that they disclose processes and aluminum alloy compositions for making aluminum foils. However, it should be appreciated that other aluminum alloy compositions and other processes can be used in combination with the method of the present invention for forming the coated aluminum foil.

The method of preparing the non-stick coated aluminum foil includes preparing the coating composition by mixing all ingredients of the coating composition, and diluting the mixture with a solvent to the desired silicone resin solids content. Preferably, the silicone resin is in a solution. The other ingredients of the composition, are added to the resin solution and stirred until dissolved. Additional solvent may be added. The desired thickness of the coating and the method of application dictates the desired silicone resin solids content and thus the amount of additional solvent, if any, to be added to the composition. In all cases, however the solvent is just a carrier for the coating. It is removed during the curing of the coating.

Referring now to the sole FIGURE, an exemplary processing sequence is illustrated for the inventive method. The coating composition is then applied on at least one side of an aluminum foil to form a thin coating layer. Preferably, the coating is applied uniformly to cover the whole area of at least one side of the foil using a gravure cylinder, however, it should be appreciated that only a portion of one side of the foil may be coated also. Other methods of applying the coating on the aluminum foil also can be used such as for example dipping and spraying. The type of gravure cylinder used and the weight of the silicone resin in the coating composition solution ("silicone resin solids content" or "silicone resin solids") determine the thickness of the layer of the dry coating. Preferably, the coating composition is applied onto the aluminum foil in an amount that may range from about 0.01 to 1 pounds (0.00453 to 0.4536 kilograms) per ream (3,000 square feet) and more preferably from about 0.05 to 0.1 pounds (0.02268 to 0.04536 kilograms) per ream, based on dried coating weight not including any solvent. However, thinner or thicker coating layers also can be made in accordance to the present invention, if desired.

Once the coating is applied onto the aluminum foil, the coated aluminum foil is subjected to a first heating step. The first heating step dries the coating by evaporation of the solvent and partially cures the coating. The first heating step includes sufficiently curing the coating to allow further handling and processing of the partially cured coated aluminum foil to facilitate further or complete curing in bulk without blocking or sticking problems. For instance, sufficient curing is accomplished by heating the aluminum foil to a sufficiently high temperature and for sufficient time to allow handling and processing steps such as winding the coated aluminum foil in a coil without blocking or sticking of the partially cured coating layer. In a preferred embodiment, wherein only one side of the aluminum foil is coated with the coating of the invention the first curing step includes passing the coated aluminum foil through an oven in a continuous process at a throughput rate and at an oven temperature sufficient to allow the temperature of the surface of the side of the aluminum foil that is not coated (also referred to as the "metal surface temperature") to reach a temperature of at least 480° F. (249° C.) as the coated aluminum foil exits the oven.

It has been unexpectedly discovered that if the temperature of the metal surface of the side of the aluminum foil which is not covered by the coating reaches a temperature of at least 480° F. (249° C.) then a coating having a weight of from about 0.05 pounds per ream to about 0.1 pounds per ream is sufficiently cured to prevent blocking and sticking problems in the final curing stage. The temperature and time of the first heating step depend upon such factors as the thickness of the coating and the silicone resin solids content. If for any reason insufficient heating is achieved in the first heating step, the coating will have a tendency to block or stick in the final curing stage. In a preferred embodiment of the present invention the application and partial curing of the coating is performed at the same throughput rate as the throughput rate of the upstream process for making the aluminum foil. This allows application of the coating without having to slow down the continuous process for making the aluminum foil.

The coated aluminlum foil may then be wound in a coil. The coil may be cooled down, preferably gradually by well known methods employing air or a liquid cooling medium. The coated aluminun foil in the coil form is then subjected to a second heating step, also referred to as a reheating step or final curing step. The second curing step includes heating the coated aluminum foil to a temperature and for a time sufficient to complete the curing of the coating composition, in bulky in order to achieve the desired coating characteristics. The desired characteristics may vary depending upon the desired application for the coated alumninwn foil product For example, desired characteristics include the degree of non-stckiness and the bonding of the coating layer to the aluminum foil substrate. Non-stickiness maybe determined by the cooking, grilling and freezing tests described in the Examples. Bonding to the substrate may be determined by a tape adhesion test described in the Examples.

In one embodiment, the coated aluminum foil is reheated to a temperature of about 425° F. for about three hours for a coating having a desired weight of about 0.05 to about 0.3 pounds per ream. Lower temperatures with longer times or higher temperatures with shorter times could be used. However, it is preferred to employ lower temperatures and higher residence times in order to minimize operating costs. For instance, the coated aluminum foil may be heated to a temperature of from about 350° F. (177° C.) to about 500° F. (260° C.), for about 5 hours to about 1 hour. Preferably, the second curing step includes heating the aluminum foil in coil form inside an oven. The temperature of the oven will vary depending on factors such as the size of the coil, and the thickness of the coating.

During the second heating step some residual solvent or by-products of the curing reaction may be released. Without intending to limit the invention in any way, it is theorized that the addition of the hindered phenol antioxidant prevents oxidation of these by-products, which otherwise may result in an off odor imparted to the coating. Thus, the present invention method allows application of a curable coating layer to an aluminum foil at an optimum production rate. Moreover, the present invention method does not impart an undesirable off odor to the aluminum foil as a result of curing the coating.

According to an embodiment of the present invention the aluminum foil having a partially cured coating layer from the first curing step is slit and arranged in stacks which are placed inside an oven to complete the curing of the coating layer. Alternatively, the foil may be slit after complete curing, spooled and further processed as necessary to provide commercial products. If only one side of the aluminum foil is coated it is preferred, either during the curing process or in subsequent processing, to use a technique such as embossing text in the foil to indicate which side is the coated or non-stick side.

Variations and modifications within the scope of the invention will become apparent when considered together with the following examples, which are set forth as being merely illustrative of the invention and which are not intended, in any manner, to be limiting. Unless otherwise indicated, all parts and percentages are by weight.

EXAMPLES

Example 1

A non-stick, polymer coating was made having the following composition.

| | Parts |
|---|---|
| Silicone Resin (50% in solution) | 200 |
| Silicone release agent | 2.8 |
| Zinc neodecanate | 1.2 |
| BHT (butylated hydroxy toluene) | 0.1 |

The silicone resins used were 50% solvent and 50% solids, thus the amounts listed in the above table are based on 100 parts of the silicone resin solids. The silicone resin was SILIKOFTAL®, non-stick 50 and the silicone release agent was SF96® 100.

Example 2

The non-stick polymer coating as in Example 1 was made in the same way except that the silicone resin was BAYSILONE® resin M 120XB.

Example 3

The non-stick polymer coating as in Example 1 was made in the same way except that the silicone release agent was Dow Corning 1-9770.

Example 4

The non-stick polymer coating as in Example 1 was made in the same way except that the silicone release agent was used in an amount of 3.2 parts based on 100 parts of silicone resin solids i.e., 3.2 percent by weight based on the silicone resin weight.

Example 5

The non-stick, polymer coating as in Example 1 was made in the same way except that the silicone release agent is used in an amount of 5 parts based on 100 parts of silicone resin solids.

Example 6

The non-stick, polymer coating as in Example 1 was made in the same way except that the BHT was used in an amount of 0.5 parts based on 100 parts of silicone resin solids.

Example 7

The non-stick, polymer coating as in Example 1 was made in the same way except that the BHT was used in an amount of 1.0 parts based on 100 parts of silicone resin solids.

Example 8

The non-stick, polymer coating as in Example 1 was made in the same way except that the BHT was used in an amount of 2.0 parts based on 100 parts of silicone resin solids.

Example 9

Non-stick, polymer coated aluminum foils were prepared using the coating compositions as in Examples 1–4. Due to the solvent that comes with the silicone resins, the silicone resin solids content of the coating compositions was initially just above 50 percent. The silicone resin solids content of the coating compositions was then diluted to a range of from about 20 to about 35 percent using ethyl acetate as a solvent.

The coating compositions of Examples 1–4 were applied uniformly on one side of the aluminum foil using a gravure cylinder to form a coating layer in an amount of about 0.75 pounds (0.3402 kilograms) per ream.

Once the coating compositions were applied, the foil with the coating in web form was passed through an oven where the coating was dried and partially cured. During this step the oven temperature was set sufficiently high to allow the metal surface temperature of the coated foil to reach at least 480° F. (249° C.) at the desired throughput rate.

The aluminum foil was then wound up in a coil and gradually cooled using air. Following the cooling step, the aluminum foil was subjected to a final heating step to complete the curing of the coating at an oven temperature sufficient to provide a metal temperature of the surface of the aluminum foil that was not covered with the coating of about 425° F. (218° C.). The presence of BHT substantially prevented the generation of an off odor in this curing step by inhibiting the formation of oxidative by-products.

Example 10

The method as in Example 9 is repeated to make a non-stick, polymer coated aluminum foil except that the metal surface temperature of the aluminum foil in the first heating step reaches 500° F. (260° C.).

Example 11

The method as in Example 10 is repeated to make a non-stick, polymer coated aluminum foil except that the temperature of the aluminum foil in the second heating step reaches 400° F. (204° C.).

The coated aluminum foils of Examples 9–11 had a satisfactory non-stick coated surface, and no off odor. Moreover, no blocking or sticking problems were experienced between the first and second curing steps or during the second curing step.

Example 12

The degree of non-stickiness of the non-stick, polymer coated aluminum foils of Example 9–11 are determined by a series of cooking, grilling and freezing tests.

Cooking Tests

Cookie dough such as NESTLE TOLL HOUSE reduced fat chocolate chip cookie dough is placed by a rounded teaspoon on cookie sheets made with the non-stick, polymer coated aluminum foils prepared according to Examples 9–11 and baked in an oven in accordance with the directions on the package. After cooling for 3 minutes, the cookies are removable with a spatula and leave no residue on the foil.

Chicken pieces, with and without skin are placed on a baking pan lined with a non-stick, polymer coated aluminum foil prepared according to Example 9 in an oven at 400° F. (204° C.) for 50 minutes. After cooking, the chicken does not stick to the foil.

Grilling Tests

A non-stick, polymer coated aluminum foil prepared according to Examples 9–11 is placed on a grill preheated to 400–450° F. (204–232° C.). Cod filets, approximately ½–¾ pounds each are cooked for 10–15 minutes, turning twice. The fish does not stick to the foil.

Foil is placed on a grill preheated to 400–450° F. (204–232° C.). Chicken pieces, with and without skin are placed on the foil and grilled for 15 to 35 minutes. After cooking, the chicken pieces do not stick to the foil.

Freezing tests

Hamburger patties are separated by sheets of non stick, polymer coated aluminum foil prepared according to Examples 9–11. The hamburger patties are overwrapped with foil and placed in the freezer for 5 days. After removal, the patties are easily separated and do not stick to the foil.

Example 13

Bonding to the substrate is determined by a tape adhesion test. A fresh piece of 1 inch wide Scotch 3M cellophane tape #610 is placed on a sample of a non-stick, polymer coated aluminum foil, prepared according to Examples 9–11, in the cross machine direction, leaving a free length for grasping. The tape is smoothed using finger pressure. The tape is pulled back at an angle of approximately 45°, quickly, but not jerked and at a rate not so great as to cause rupture of the substrate or tearing of the tape. Acceptable bonding is achieved if no coating is removed.

Example 14

Samples of non-stick, polymer coated aluminum foils prepared according to Examples 9–11 are exposed in an oven for 24 hours at 600° F. (315.5° C.). No substantial peeling, cracking or loss of coating is observed.

The foregoing examples have been presented for the purpose of illustration and description only and are not to be construed as limiting the scope of the invention in any way. The scope of the invention is to be determined from the claims appended thereto.

I claim:

1. A non-stick, polymer coated aluminum foil comprising:

an aluminum foil; and a non-stick, polymer coating bonded on at least a portion of one side of the aluminum foil wherein said polymer coating comprises a non-stick, coating composition comprising, a silicone resin selected from the group consisting of dimethyl polysiloxanes, polyester-modified methylphenyl polysiloxanes, and hydroxyl functional silicone resins;

a silicone release agent; and a hindered phenol antioxidant.

2. The non-stick, polymer coated aluminum foil of claim 1, wherein said silicone release agent is a polydimethylsiloxane liquid compound.

3. The non-stick, polymer coated aluminum foil of claim 1, wherein said hindered phenol is butylated hydroxy toluene.

4. The non-stick, polymer coated aluminum foil of claim 1, wherein said hindered phenol is used in an amount of from about 0.1 to about 4.0 percent by weight based on the weight of the silicone resin.

5. The non-stick, polymer coated aluminum foil of claim 1, wherein said silicone release agent is used in an amount of from about 0.1 to about 5.0 percent by weight, and said hindered phenol is used in amount of from about 0.1 to about 4.0 percent by weight based on the weight of the silicone resin.

6. A method of making a coated aluminum foil comprising:

applying a curable coating composition on at least a portion of one side of an aluminum foil to form a coated aluminum foil; and partially curing the coating composition in a heating step by heating the coated aluminum foil at a sufficiently high temperature to allow subsequent completion of the curing of the coated aluminum foil in bulk without blocking.

7. The method of claim 6, wherein said first heating step further comprises passing the coated aluminum foil through an oven in a continuous process at a throughput rate and at an oven temperature sufficient to allow the temperature of the metal surface of the aluminum foil to reach a temperature of at least 480° F. as the coated aluminum foil exits the oven.

8. The method of claim 6, further comprising the steps of winding the partially cured coated aluminum foil in a coil;

cooling the aluminum foil in coil form; and a second heating step comprising heating the aluminum foil in coil form to a temperature and for a time sufficient to complete the curing of the coating composition.

9. The method of claim 6, wherein said coating composition is applied on said aluminum foil in an amount of from about 0.025 lbs. to about 0.040 lbs. per 3,000 square feet.

10. The method of claim 6, wherein said cooling of the aluminum foil in coil form is done gradually by air or liquid.

11. The method of claim 6, wherein said curable coating composition comprises:

a silicone resin, a silicone release agent, a silicone resin curing agent, a hindered phenol antioxidant and a solvent.

12. The method of claim 8, wherein said second heating step includes heating the aluminum foil in coil form to a temperature of from about 350° F. to about 500° F., for about 5 hours to about 1 hour inside an oven.

13. The method of claim 8, wherein said second heating step includes heating the aluminum foil in coil form to a temperature of at least 425° F. for about 3 hours.

14. The method of claim 11, wherein said silicone resin is selected from the group consisting of dimethyl polysiloxanes, polyester-modified methylphenyl polysiloxanes and hydroxyl functional silicone resins.

15. The method of claim 11, wherein said hindered phenol antioxidant is butylated hydroxy toluene.

16. A method of making a non-stick, coated aluminum foil comprising:

applying a curable coating composition on at least a portion of one side of an aluminum foil;

partially curing the coating composition in a first heating step sufficiently to allow winding the coated aluminum foil in a coil without blocking of the coating composition; and completing the curing of the coating composition in a second heating step of the aluminum foil in coil form.

17. The method of claim 16, wherein said partial curing step includes passing the coated aluminum foil through an oven in a continuous process at a throughput rate which is the same as the throughput rate of an upstream process for making the aluminum foil and at an oven temperature sufficient to allow the metal surface temperature of the aluminum foil to reach a temperature of at least 480° F. as it exits the oven.

18. The method of claim 16, wherein completing the curing includes heating the aluminum foil in coil form in bulk inside an oven.

19. The method of claim 16, wherein completing the curing includes heating the aluminum foil in coil form to a temperature of from about 350 to about 500° F., for about 5 to about 1 hour.

20. The method of claim 16, wherein completing the curing includes heating the aluminum foil in coil form to a temperature of at least 425° F. for about 3 hours.

21. The method of claim 16, further comprising gradual cooling of the partially cured coated aluminum foil by air or liquid.

22. The method of claim 16, wherein the coating composition is applied using a graver cylinder.

23. The method of claim 16, wherein said curable coating composition comprises:

a silicone resin, a silicone release agent, a silicone curing agent, a hindered phenol antioxidant and a solvent.

24. The method of claim 23, wherein the hindered phenol antioxidant is butylated hydroxy toluene.

25. The non-stick, polymer coated aluminum foil formed by the method of claim 7.

26. The non-stick, polymer coated aluminum foil wherein said non-stick polymer coating is formed by the method of claim 8.

27. A method of making a coated aluminum foil comprising:

applying a curable coating composition on at least a portion of one side of an aluminum foil to form a coated aluminum foil;

partially curing the coating composition in a first heating step by heating the coated aluminum foil at a sufficiently high temperature to allow winding the coated aluminum foil in a coil without blocking of the coating composition;

cooling the aluminum foil in coil form; and heating the aluminum foil in coil form in a second heating step to a temperature and for a time sufficient to complete the curing of the coating composition.

28. The method of claim 27, wherein said first heating step further comprises passing the coated aluminum foil through an oven in a continuous process at a throughput rate and at an oven temperature sufficient to allow the temperature of the metal surface of the aluminum foil to reach a temperature of at least 480° F. as the coated aluminum foil exits the oven.

29. The method of claim 27, wherein said coating composition is applied on said aluminum foil in an amount of from about 0.025 lbs. to about 0.040 lbs. per 3,000 square feet.

30. The method of claim 27, wherein said cooling of the aluminum foil in coil form is done gradually by air or liquid.

31. The method of claim 27, wherein said curable coating composition comprises a silicone resin, a silicone release agent, a silicone resin curing agent, a hindered phenol antioxidant and a solvent.

32. The method of claim 31, wherein said silicone resin is selected from the group consisting of dimethyl polysiloxanes, polyester-modified methylphenyl polysiloxanes and hydroxyl functional silicone resins.

33. The method of claim 31, wherein said hindered phenol is butylated hydroxy toluene.

34. The method of claim 27, wherein said second heating step includes heating the aluminum foil in coil form to a temperature of from about 350° F. to about 500° F., for about 5 hours to about 1 hour inside an oven.

35. The method of claim 27, wherein said second heating step includes heating the aluminum foil in coil form to a temperature of at least 425° F. for about 3 hours.

36. A method of making a non-stick, coated aluminum foil comprising:

applying a curable coating composition on at least a portion of one side of an aluminum foil;

partially curing the coating composition in a first heating step by heating the coated aluminum foil at a sufficiently high temperature to allow subsequent completion of the curing of the coated aluminum foil in bulk without blocking;

winding the coated aluminum foil in a coil; and completing the curing of the coating composition by heating the aluminum foil in coil form in bulk.

37. The method of claim 36, wherein said partial curing step includes passing the coated aluminum foil through an oven in a continuous process at a throughput rate which is the same as the throughput rate of an upstream process for making the aluminum foil and at an oven temperature sufficient to allow the metal surface temperature of the aluminum foil to reach a temperature of at least 480° F. as it exits the oven.

38. The method of claim 36, wherein completing the curing includes heating the aluminum foil in coil form to a temperature of from about 350 to about 500° F., for about 5 hours to about 1 hour.

39. The method of claim 36, wherein completing the curing includes heating the aluminum foil in coil form to a temperature of at least 425° F. for about 3 hours.

40. The method of claim 36, wherein the coating composition is applied using a gravure cylinder.

41. The method of claim 36, wherein said curable coating composition comprises a silicone resin, a silicone release agent, a silicone curing agent, a hindered phenol antioxidant and a solvent.

* * * * *